United States Patent [19]

Mylander

[11] Patent Number: 4,546,664
[45] Date of Patent: Oct. 15, 1985

[54] TRANSMISSION CONTROL ASSEMBLY

[75] Inventor: Richard H. Mylander, Glen Ellyn, Ill.

[73] Assignee: J. I. Case Company, Racine, Wis.

[21] Appl. No.: 446,921

[22] Filed: Dec. 6, 1982

[51] Int. Cl.⁴ .................. B60K 20/04; F16H 3/08; F16D 31/02
[52] U.S. Cl. .................. 74/473 R; 74/330; 60/427
[58] Field of Search .............. 74/473 R, 475, 471 XY, 74/730, 879, 330; 180/333; 60/389, 391, 427, 487

[56] References Cited

U.S. PATENT DOCUMENTS

| | | | |
|---|---|---|---|
| Re. 29,414 | 9/1977 | Prokop | 74/473 R X |
| 1,819,688 | 8/1931 | Moore | 74/879 |
| 2,772,652 | 12/1956 | Du Shane et al. | 74/473 R X |
| 2,917,941 | 12/1959 | Wittren | 74/473 |
| 3,290,955 | 12/1966 | Keller et al. | 74/473 R X |
| 3,350,957 | 11/1967 | Morse | 74/473 R |
| 3,401,522 | 9/1968 | Hann et al. | 74/473 R |
| 3,433,087 | 3/1969 | Winter et al. | 74/473 R |
| 3,616,709 | 11/1971 | Malim | 74/473 R |
| 3,898,891 | 8/1975 | Colloton | 74/474 |
| 3,916,717 | 11/1975 | Heintz | 74/473 R |
| 4,060,157 | 11/1977 | Hillstrom | 74/473 R X |
| 4,085,833 | 4/1981 | Papasideris | 74/473 R X |
| 4,297,909 | 11/1981 | Crouse | 74/475 X |

FOREIGN PATENT DOCUMENTS

| | | | |
|---|---|---|---|
| 1031733 | 6/1953 | France | 74/473 R |
| 356641 | 9/1931 | United Kingdom | 74/473 R |

Primary Examiner—Leslie A. Braun
Assistant Examiner—Stephen B. Andrews
Attorney, Agent, or Firm—Dressler, Goldsmith, Shore, Sutker & Milnamow, Ltd.

[57] ABSTRACT

A single lever control facilitating engagement of the speed and range transmission of an agricultural tractor comprising a handle lever initially engaging range gears and subsequently variable speed transmission when moved in one direction and engaging reverse speed when moved in the opposite direction.

1 Claim, 3 Drawing Figures

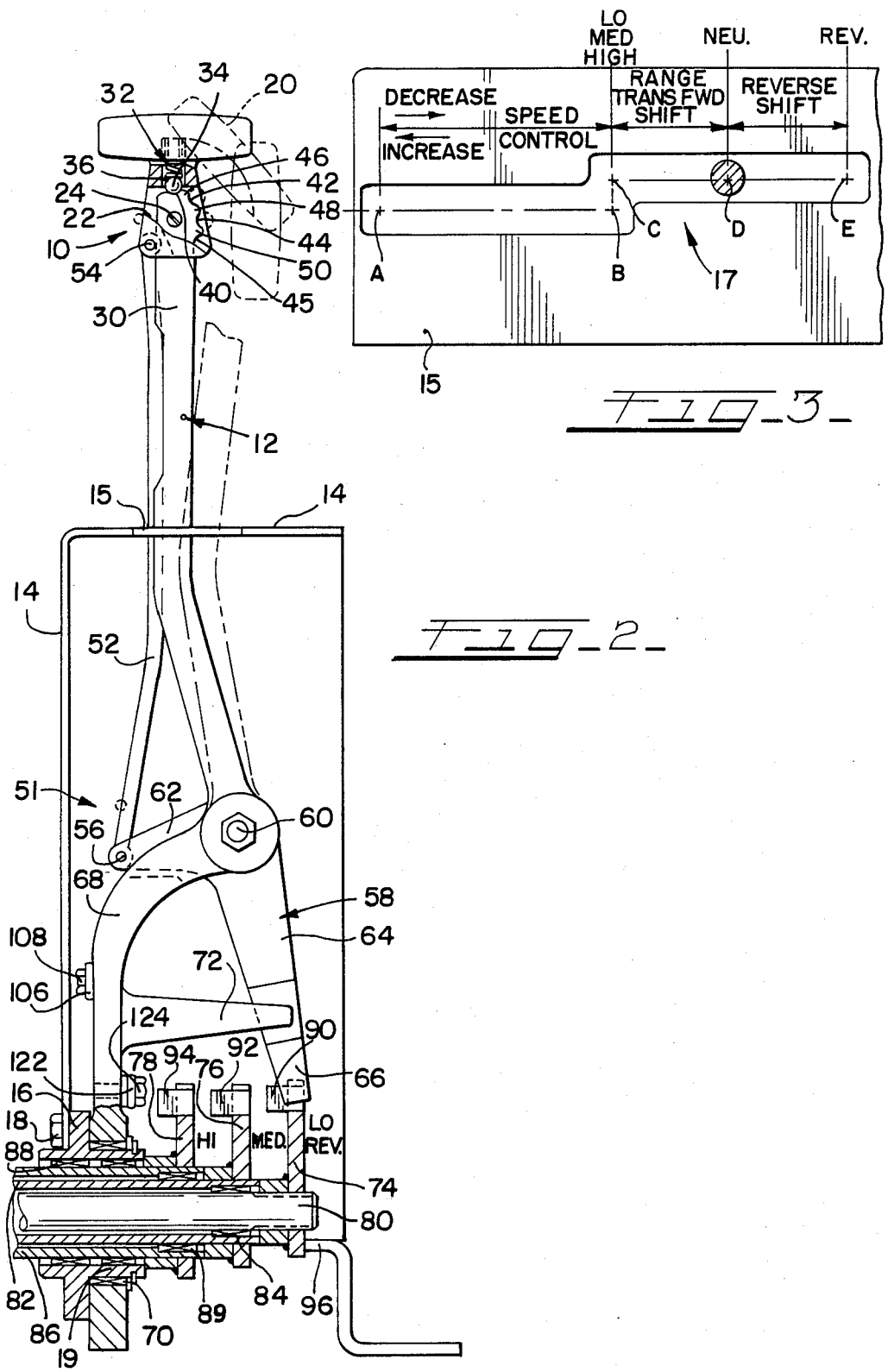

1

TRANSMISSION CONTROL ASSEMBLY

BACKGROUND OF THE INVENTION

1. Field of the Invention

The invention pertains to motor vehicle transmission controls and more particular to a single lever control of the speed and range transmission.

2. Description of the Prior Art

The prior art is replete with various examples of motor vehicle transmission control assemblies. For instance, the U.S. Pat. No. 2,917,941, issued to Wittren, discloses a single selector lever moveable through a shift pattern having a plurality of parallel slots and an intersecting cross-over slot.

Another U.S. Pat. No. 3,616,709, issued to Malm, discloses a transmission control mechanism for a tractor having a resiliently mounted control console.

However, none of the patent references of record describe, illustrate, or teaches the novel transmission control assembly and operation thereof as disclosed hereinbelow.

SUMMARY OF THE INVENTION

The invention provides for a motor vehicle having a range and speed transmission control assembly which is mounted on a vehicle cab console. The control assembly comprises a handle lever reciprocally moveable within a slotted guide plate. The handle lever is operatively connected with a speed transmission control means rigidly secured to a speed shaft. The handle lever reciprocal movement within the guide plate effectuates rotation of the speed shaft in opposite directions, thereby increasing or decreasing the speed output.

BRIEF DESCRIPTION OF THE DRAWINGS

FIG. 2 is a partially cross-sectional view of the transmission control assembly taken substantially along the lines 2—2 in FIG. 1;

FIG. 3 is a top view of a guide plate of the transmission control assembly taken substantially along the lines 3—3 in FIG. 1.

DESCRIPTION OF THE PREFERRED EMBODIMENT

Figure 1:
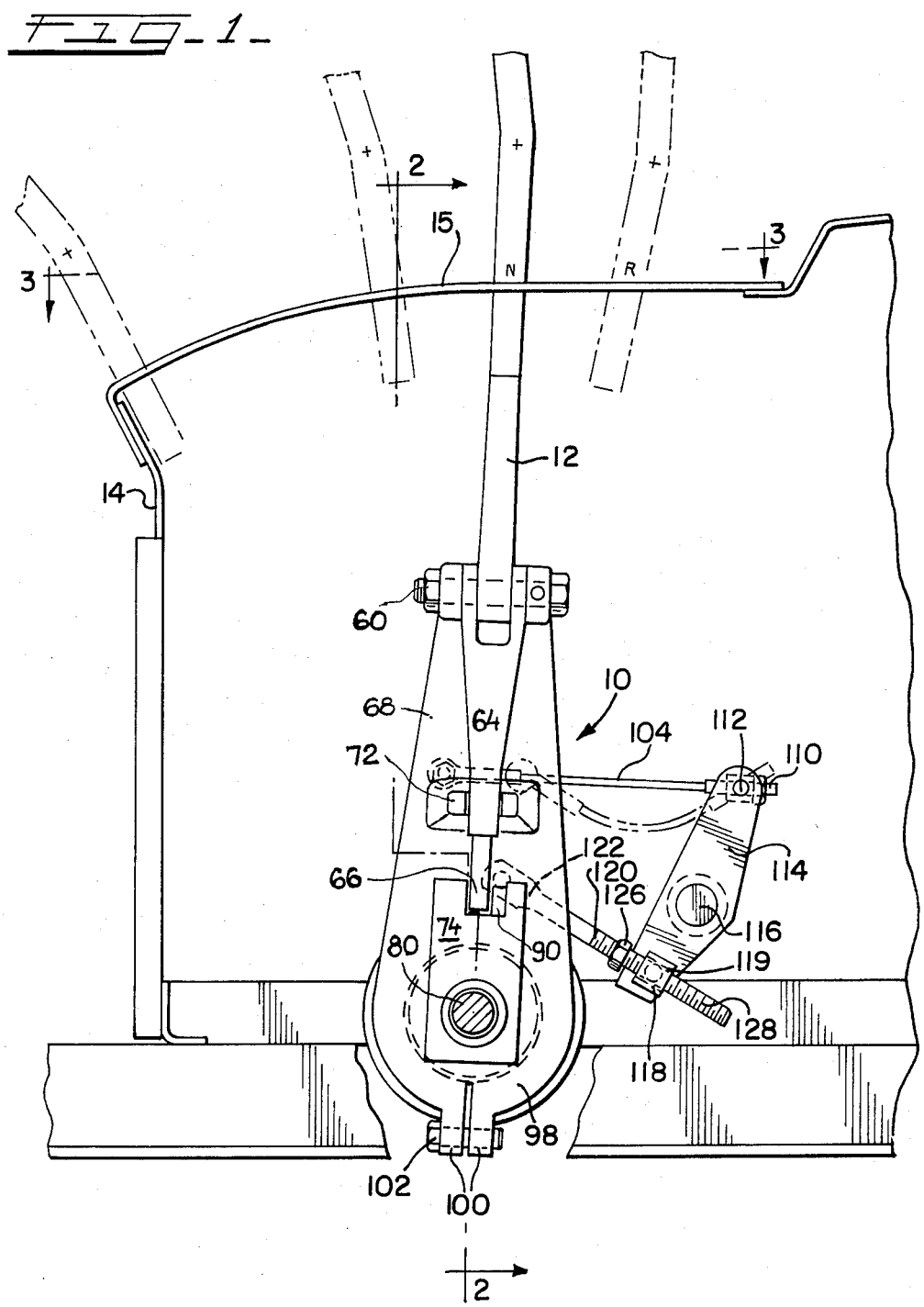
FIG. 1 is a partially fragmentary side view of a transmission control assembly.

The invention may be carried into practice in a number of ways but one specific embodiment of mechanical range and hydrostatic speed transmission control will be described by way of example only. The invention illustrates a single lever control of speed and range tractor, or the like vehicle, transmissions.

Referring now to the drawings wherein reference characters designate like or corresponding parts throughout the several view, there shown in FIG. 1 a transmission control assembly 10. The selection of ranges by a transmission control knob 20 mounted on the handle lever 12 is described in the concomitant and co-assigned application Ser. No. 446,919, filed on Dec. 6, 1982.

A vehicle control console 14 includes a slotted guide plate 15. The guide plate 15 comprises a Z-shaped slot 17 for the handle lever 12 movement therewithin. The slot 17, as best shown in FIG. 3, has a variable speed control section AB, the range disengagement or offset section BC, forward range transmission shift section CD and reverse shift section DE. The neutral position of the range transmission engagement is indicated by a letter D. The reverse position is indicated by a letter E. C represents a completely engaged range position for all ranges (LO, MED, HI). The distance between C and D reflects the disengagement of the handle lever 12 from a range engaging section CD into the variable speed section AB for the speed control therein.

The console 14 is rigidly secured to a mount plate 16 by virtue of a bolt 18 or other suitable mechanical means. The mount plate 16 also includes a hollow shaft section 19 extending transversely to the console wall 14.

Referring now to the upper portion of FIG. 2, a shank portion 22 is shown depending downwardly from the knob 20, so as to form a T-shaped knob. The pivot pin 24 interconnects the legs extending downwardly from the shank 22, thereby facilitating rotation of the knob 20 about the handle lever 12. The legs saddle on a top portion 30 of the handle lever 12. The detent mechanism 32, utilized for a positive fixation of the knob 20 on the handle lever 12, includes a ball 34 reciprocably moveable within the bore 36 drilled in the shank 22 and knob 20. A compression spring, housed in the bore 36, urges the ball 34 to move into a series of sockets circumferentially located on the top handle lever portion 30. Each of the sockets 40, 42, 44 and 48 separated by prongs 46, 48 and 50, correspond to a specific position of the transmission knob assembly 10 engaging range gears, as will be described hereinbelow.

The connection of the knob 20 with the range transmission is carried out by virtue of a link system 51. The link system 51 comprises a link 52 pivotally interconnected with the shank legs by a link pin 54. Another end of the link 52 is pivotally joined at 56 with the bell crank lever 58, which is rotatably supported by a shoulder bolt 60. The bell crank lever 58 includes a short arm 62 attached to the pivot joint 56 and a long arm 64 with a tip portion 66.

The bifurcated support bracket 68 carrying the pivot bolt 60 in its upper portion is journalled on needle bearings 70 supported by the mount plate shaft section 19. The 2-prong buttress fork 72, also shown in FIG. 3, partially encompasses and absorbs the pressure applied to the long arm 64 moveable therewithin. This pressure is applied to the bell crank lever 58 when the handle lever 12 moves about the plate 19 and engages the range transmission gears by rotating gear selector plates 74, 76 and 78. The first gear selector or range plate 74 engages the LO range when rotated in one direction or reverse (REV) speed if rotated in the opposite direction. The second gear selector or range plate 76 engages medium (MED) range transmission gears. Finally, the third gear selector plate 78 engages gears in the HI range. The first range plate 74 is unitary with the shaft 80 passing through the inner quill shaft 82, which carries the second gear selector plate 76 attached thereto. The quill shaft 82 is journalled on needle bearing 84 supported by the shaft 80. The outer quill shaft 86 rigidly secured to the HI gear selector plate 78 is supported by needle bearings 88 disposed within the mount plate shaft section 19 and bearings 89 on the shaft 82.

The engagement of the range pads 74, 76 and 78 is accomplished by virtue of reactive abutment of the tip 66 of the long arm 64 with a contact pad 90 on the range plate 74, pad 92 on the plate 76, and pad 94 on the plate 78. The console or vehicle cab floor 96 is abuttingly disposed around the range plate arrangement.

The mount bracket 68 comprises at its lower portion a friction clamp 98 providing secure positioning of the bracket on the shaft portion of the mount plate 16. The friction clamp 98 has downwardly extending lips 100 interconnected by a shoulder bolt 102.

The speed control of the transmission is carried out by virtue of the handle lever 12 displacement along the slot 17 in the guide mount plate 15. The support bracket 68 is connected with a flexible cable 104 by a cable tip hook 106, better shown in FIG. 2, secured to the bracket 68 by a bolt 108. Another end of the cable 104 is locked in the lock cylinder 110 which is rotatably connected by a pivot pin 112 to a swash plate 114. The speed of a hydrostatic motor of the tractor speed transmission is controlled by the rotation of the motor swash plate 114. The control or swash plate 114 regulates the hydrostatic motor speed by rotating the speed shaft 116 to which it is integrally attached. The rotation of the speed shaft 116 in one direction causes the vehicle speed increase and rotation in the opposite direction - the speed decrease. As shown in FIG. 1, the swash plate 114 has a stop block 118 rigidly secured thereto and having a bore 119. The stop block 118 is a part of the reverse speed mechanism regulating the rotation of the shaft 116 via angular displacement of the swash plate 114, when the handle lever 12 is shifted from the neutral position D to the reverse position E. The reverse speed rod 120 is slideable through the bore 119 and has a flat end 122 secured to the support bracket 68 by a bolt 124. The reverse speed rod 120 includes a guide or stop nut 126 screwed on the threaded portion 128 of the rod 120. The threaded portion 128 slides through the stop block 118 in the process of the support bracket 68 movement during the forward shift range engagement. The stop nut 126 reactively abuts the block 118, when the handle lever 12 is shifted into the reverse position, thereby rotating the swash plate 114, counterclockwise as shown in FIG. 1, into a predetermined angular position.

In operation, the range selection is accomplished by the knob 20 rotation, or by any other suitable mechanism. Thereafter, the selected range engagement is completed by the handle lever 12 movement from the neutral position D toward the fully engaged range position C. During this range engaging displacement of the handle lever 12 the cable 104 is getting tight and completely stretched in the C position. When the lever 12 shifts from C to B position, the bell crank tip 66 leaves the contact pad of the range gear selector plate and is free to move further forward along the AB (variable speed) section. The linear displacement of the handle lever 12 from B to A necessitates the rotation of the swash plate 114 via the stretched cable 104 so as to increase the tractor speed. The lever 12 movement from A to B leads to the tractor speed decrease, because the swash plate 114 rotates in the opposite direction by a return spring mechanism which is not shown in the drawings. The rearward movement from A to B of the lever 12 in the variable speed control section results in diminishing of the tractor speed so as to provide a smooth disengagement from the speed section of the slotted guide plate 16 to the fully engaged range position C. Moving lever back across the offset from B to C re-engages the bell crank lever tip 66 with the selected gear selector plate and further rearward movement of the lever 12 to the neutral position D shifts transmission out of gear.

The cable 104 is slackened again and thus not affecting the swash plate 114 position change. The further movement of the lever 12 from the neutral position D to the reverse position E causes the reverse speed rod 120 to slide through the block 118 until the stop nut 126 abuts and reactively engages the block 118. This turns the swash plate 114 for a predetermined angle thereby providing a reverse speed corresponding to that angle. Conversely, shifting the lever from E to D position brings the nut 126 out of the reactive engagement with the stop block 118 and reverse speed engagement.

The subject invention has an advantage of utilizing single lever movements in lieu of two lever movements and assemblies conventionally used in agricultural tractors. Also, it is expedient to permit the return of the swash plate to the slowest speed position before shifting gears of the range transmission. This facilitates easier shifting and stress alleviation for the transmission components.

The shifting motion is exactly the same for each forward range after the selection thereof by the rotating knob. This differs from the conventional shift patterns, such as an H or E pattern where an operator must remember or look where each gear is located. This simple reciprocal shifting between forward and reverse speeds, which is necessary in operations such as loading, greatly simplifies the operator's work. The handle lever linear movement forward corresponds to the vehicle forward advancement and reverse lever movement to the vehicle reverse movement. This shift pattern provides facile and convenient control of the vehicle operation.

The foregoing description and drawings merely illustrate the preferred embodiment and the invention is not limited thereto, except insofar as the appended claims are so limited, and so those skilled in the art who have the disclosure before them will be able to make modifications and variations therein without departing from the scope of the invention.

What is claimed is:

1. A range and speed transmission control assembly for a motor vehicle comprising a handle-lever assembly reciprocably movably mounted within a z-shaped slotted guide plate and operatively connected with a speed transmission control means of said control assembly secured to a speed shaft, a first linkage connecting a handle of said handle-lever to a gear selector mechanism for varying the range selection of the control assembly to a selected gear ratio, a second linkage means connecting the handle to a control plate, the operation of said second linkage means controls the speed of the vehicle, said handle including a pivotally mounted knob portion connected to said first linkage means for moving said first linkage means independently of said second linkage means, said z-shaped slot including one leg portion through which the handle-lever assembly moves for varying the speed of the vehicle, another leg portion through which the handle-lever assembly moves to engage the transmission range, and an intermediate portion which provides for range disengagement while maintaining a selected gear ratio whereby the range selection of the control assembly can be adjusted independently of the speed control mechanism and the speed control mechanism can be operated independently of the range control mechanism.

* * * * *